United States Patent
Gorostegui et al.

(10) Patent No.: US 8,391,316 B2
(45) Date of Patent: Mar. 5, 2013

(54) FRONT-END SYSTEM FOR PROCESSING COMPOSITE WIDEBAND SIGNALS AND METHOD FOR UTILIZING SAME

(75) Inventors: Jose Ignacio Gorostegui, Laguna Beach, CA (US); Stephen Edward Krafft, Santa Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 519 days.

(21) Appl. No.: 12/590,341

(22) Filed: Nov. 6, 2009

(65) Prior Publication Data

US 2011/0110385 A1   May 12, 2011

(51) Int. Cl.
   *H04H 20/28*   (2008.01)
   *H04J 1/02*   (2006.01)
   *H04N 7/20*   (2006.01)

(52) U.S. Cl. .......... 370/487; 370/490; 370/497; 725/38; 725/59; 725/63

(58) Field of Classification Search .......... 370/464–469, 370/480, 485–487, 490, 497; 725/38, 59, 725/63, 105, 118–120, 127, 131, 143, 151
See application file for complete search history.

(56) References Cited

U.S. PATENT DOCUMENTS

| | | | | |
|---|---|---|---|---|
| 5,640,385 A | * | 6/1997 | Long et al. | 370/335 |
| 7,093,277 B2 | * | 8/2006 | Perlman | 725/142 |
| 7,106,808 B2 | * | 9/2006 | Busson et al. | 375/316 |
| 7,680,477 B2 | * | 3/2010 | Yanduru et al. | 455/340 |

* cited by examiner

*Primary Examiner* — Kerri Rose
(74) *Attorney, Agent, or Firm* — Farjami & Farjami LLP (57) ABSTRACT

According to one exemplary embodiment, a front-end system for processing a composite wideband signal comprises a pre-receiving unit including a multiplexer for separating the composite wideband signal into a plurality of filtered signals. The front-end system further comprises a plurality of discrete frequency band outputs corresponding to the plurality of filtered signals, and a tuner/down-converter coupled to at least one of the plurality of discrete frequency band outputs. In one embodiment, the pre-receiving unit of the front-end system further comprises a second multiplexer for separating at least one of the plurality of filtered signals into a second plurality of filtered signals. In one embodiment, the pre-receiving unit may further comprise a low noise amplifier for processing at least one of the plurality of filtered signals before it is input to the second multiplexer.

20 Claims, 7 Drawing Sheets

FRONT-END SYSTEM FOR PROCESSING COMPOSITE WIDEBAND SIGNALS AND METHOD FOR UTILIZING SAME

BACKGROUND OF THE INVENTION

1. Field of the Invention

The present invention is generally in the field of electronic communications circuits and systems. More specifically, the present invention is in the field of electronic filters.

2. Background Art

Satellite reception systems may be required to process many frequencies. Conventionally, satellite reception systems receive a signal that includes several frequencies. After receiving the signal, conventional satellite reception systems typically use a tuner/down-converter and filter the information in the signal into different types of content. Conventional satellite reception systems filter the signal only after digital down-conversion.

However, consumers' increasing demand for multimedia content requires the processing of composite wideband signals with large arrays of frequencies. The aggregate energy of a composite wideband signal can saturate a tuner/down-converter. A saturated receiver cannot adequately down convert signals or process users' content needs. Current technology is incapable of adequately preventing such saturation caused by composite wideband signals, of adequately down-converting such a signal, or of processing users' content needs.

An adequate and commercially feasible wideband satellite signal separation device is needed that can comfortably fit within users' homes and offices. Such a wideband satellite signal separation device should also be able to consume limited amounts of power, and maintain linearity.

Accordingly, there is a need in the art for a wideband satellite signal separation device that filters composite wideband signals before the signals are digitally down-converted by a tuner/down-converter, and that overcomes the shortcomings in the art, some of which were discussed above.

SUMMARY OF THE INVENTION

A front-end system for processing composite wideband signals and method for utilizing same, substantially as shown in and/or described in connection with at least one of the figures, and as set forth more completely in the claims.

DETAILED DESCRIPTION OF THE INVENTION

The present invention is directed to a front-end system for processing composite wideband signals and method for utilizing same. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention, which use the principles of the present invention are not specifically described in the present application and are not specifically illustrated by the present drawings.

Figure 1:
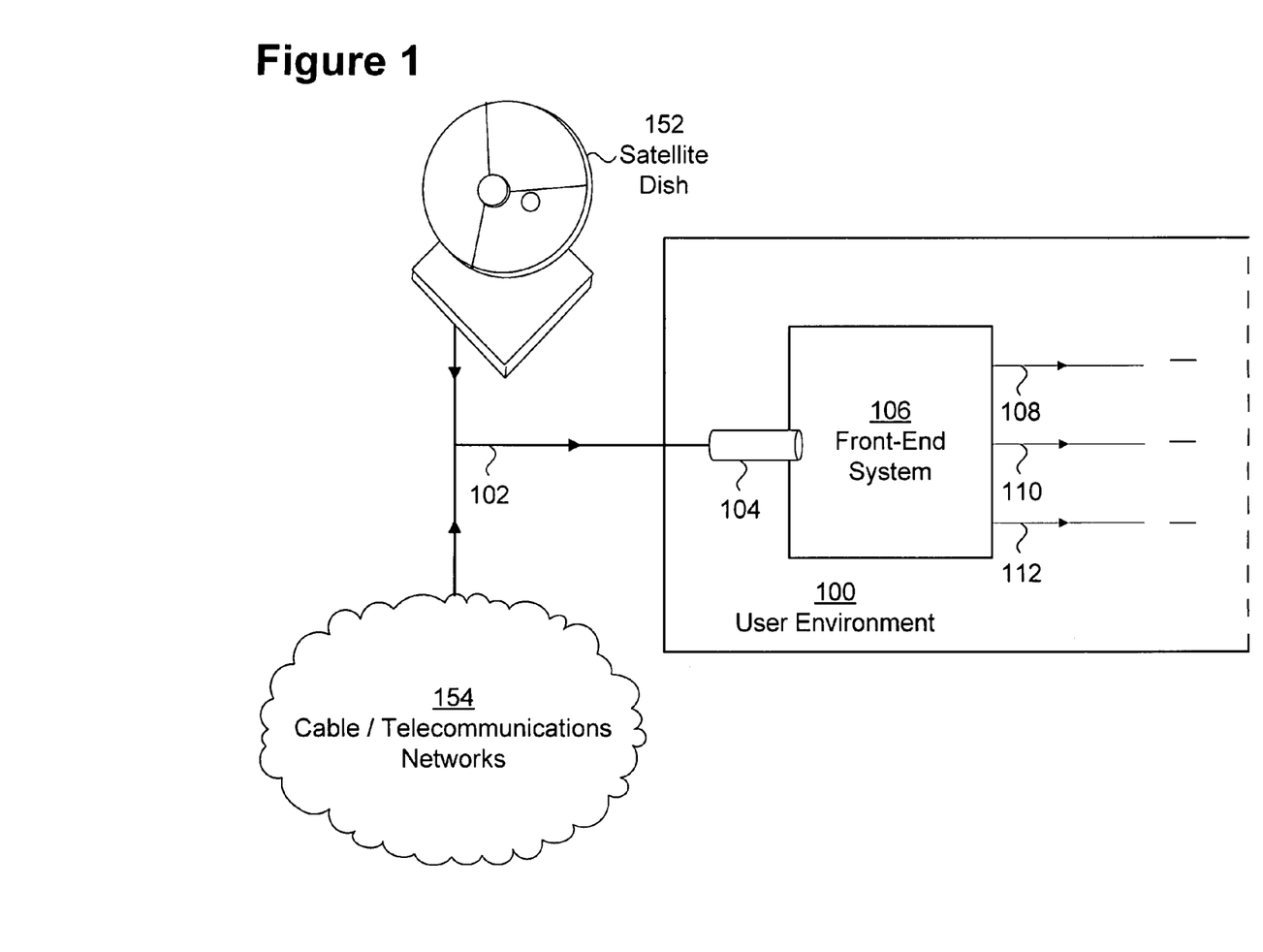
FIG. 1 is a block diagram of an example user environment including a front-end system for processing composite wideband signals, according to one embodiment of the present invention.

FIG. 1 is a block diagram of an example user environment including a front-end system for processing composite wideband signals, according to one embodiment of the present invention. While FIG. 1 provides an overview, elements shown in FIG. 1 are conceptual representations of physical and electrical elements. FIG. 1 shows exemplary front-end system 106 in user environment 100. As shown in FIG. 1, composite wideband signal 102, which may comprise signals from a variety of possible sources including satellite dish 152 and/or cable/telecommunications networks 154, passes into user environment 100 and enters front-end system 106 through a connector such as F-Connector 104. Although not shown in FIG. 1, front-end system 106 includes a pre-receiving unit and a tuner/down-converter, and is configured to process composite wideband signal 102 into signals of varying frequency. Processed signals are output by front-end system 106 and may include satellite signal 108, Multimedia over Coax Alliance (MoCA) signal 110, and/or cable television signal 112.

Figure 2:
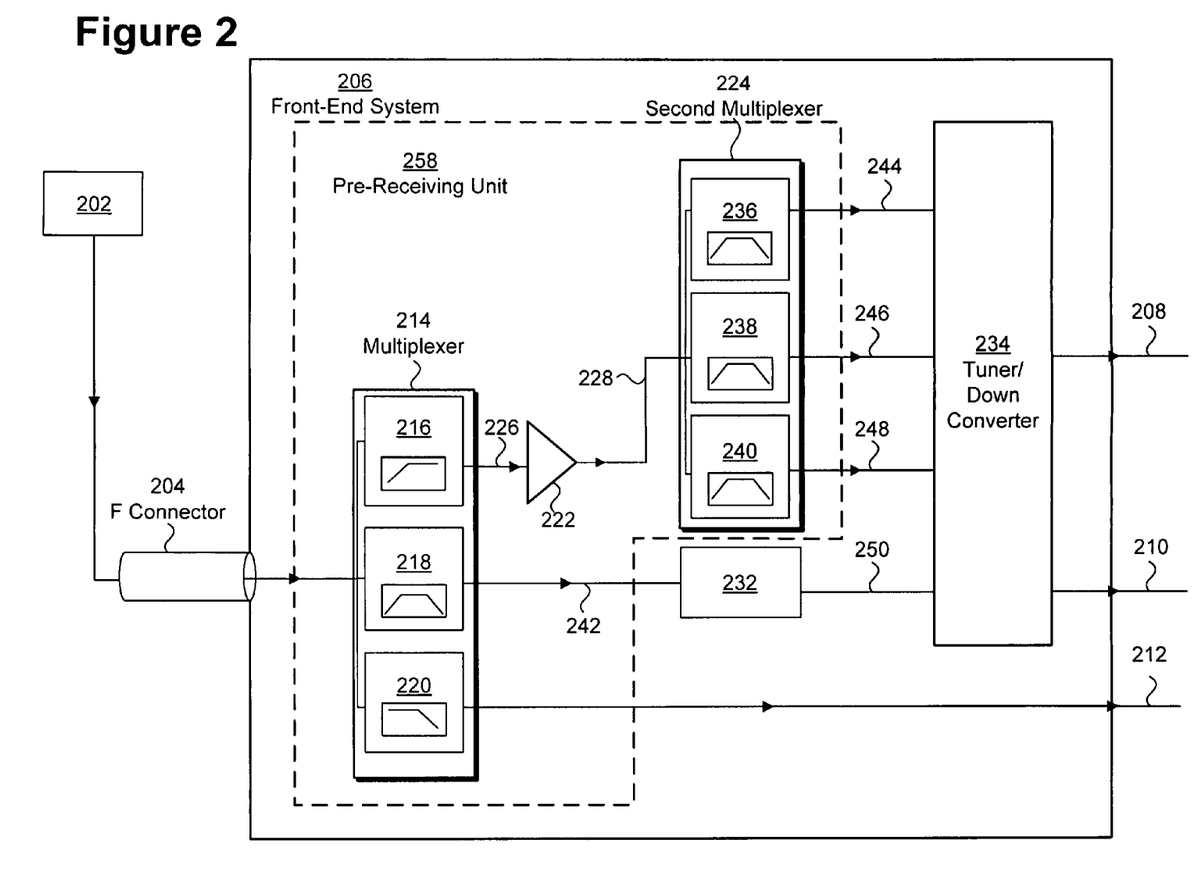
FIG. 2 is a more detailed block diagram of the front-end system for processing composite wideband signals shown in FIG. 1, according to one embodiment of the present invention.

An exemplary embodiment of front-end system 106 is shown in greater detail in FIG. 2 as front-end system 206. In this embodiment, composite wideband signal 202, corresponding to composite wideband signal 102 in FIG. 1 is processed through front-end system 206. Front end system 206 receiving composite wideband signal 202 through to F-Connector 204 and providing processed signals 208, 210, and 212, in FIG. 2, corresponds to front end system 106 receiving composite wideband signal 102 through F-Connector 104 and providing processed signals 108, 110, and 112, in FIG. 1. As shown in FIG. 2, front-end system 206 comprises pre-receiving unit 258 coupled to tuner/down-converter 234. Also shown in FIG. 2 is MoCA processing unit 232. As further shown in FIG. 2, front-end system 206 may be configured to emit processed signals from tuner/down converter 234, such as, for example, satellite signal 208, MoCA signal 210, and cable television signal 212, corresponding respectively to satellite signal 108, MoCA signal 110, and cable television signal 112, in FIG. 1.

According to the embodiment of FIG. 2, pre-receiving unit 258 of front-end system 206 may include multiplexer 214 through which wideband composite signal 202 is fed. Multiplexer 214 may process composite wideband signal 202 into several filtered signals, each filtered signal having a discrete frequency band. FIG. 2 shows that multiplexer 214 can be a triplexer with three frequency responsive filters: low-pass filter 220 with corresponding low-band cable television output signal 212, band-pass filter 218 with corresponding mid-band output signal 242, and high-pass filter 216 with corresponding high-band output signal 226. In one embodiment, for example, multiplexer 214 may be implemented on a single semiconductor die.

As shown in FIG. 2, in some embodiments of the present invention, pre-receiving unit 258 may further include second multiplexer 224. Second multiplexer 224 may be implemented to further filter high-band output signal 226 after high-band output signal 226 exits multiplexer 214, for example. A device such as low-noise amplifier (LNA) 222 may be used to process high-band output signal 226 into linearized high-band signal 228, which may in turn be input into second multiplexer 224.

Second multiplexer 224 may include a plurality of band-pass filters, for example. FIG. 2 shows second multiplexer 224 implemented as a triplexer with three band-pass filters. The plurality of band-pass filters could include low range satellite band-pass filter 236 providing low satellite band signal 244 as a filtered output signal, mid range satellite band-pass filter 238 providing mid satellite band signal 246 as a filtered output signal, and high range satellite band-pass filter 240 providing high satellite band signal 248 as a filtered output signal.

In one embodiment, low satellite band signal 244, mid satellite band signal 246, and high satellite band signal 248 may be inputted into tuner/down-converter 234. Satellite signal 208 corresponding to a satellite broadcast may then be transmitted from front-end system 206. As was the case for multiplexer 214, multiplexer 224 may be implemented on a single semiconductor die. It is noted that any of the filters on either or both of multiplexers 214 and 224 may comprise passive and/or active electronic components. However, in some embodiments, multiplexer 214 and/or multiplexer 224 may be implemented using primarily, or even exclusively, integrated passive devices.

As previously mentioned, in one embodiment of the present invention, mid-band output signal 242 may be a MoCA signal and low-band output signal 212 may be a cable television signal. As shown in FIG. 2, embodiments of the present invention configured to process MoCA signals may include MoCA processing unit 232 to, for example, further filter mid-band output signal 242 before it is provided to tuner/down converter 234 as input 250.

Thus, as shown and described herein, a front-end system according to the present inventive concepts comprises a pre-receiving unit, such as pre-receiving unit 258, and a tuner/down-converter, such as tuner/down-converter 234, coupled to at least one of a plurality of discrete frequency band outputs provided by the pre-receiving unit. The pre-receiving unit comprises at least one multiplexer, but may comprise a plurality of multiplexers.

In embodiments in which the pre-receiving unit includes only a single multiplexer, such as multiplexer 214 for separating composite wideband signal 202 into a plurality of filtered signals including low-band cable television signal 212, mid-band output signal 242, and high-band output signal 226, the discrete frequency band outputs corresponding respectively to those filtered signals and coupled by tuner/down-converter 234 may include cable television signal 212, mid-band output signal 242, and one of high-band output signal 226 or linearized high band signal 240. In other words, in some embodiments, there may be a one-to-one correspondence between the filtered signals provided by multiplexer 214 and the discrete frequency band outputs from pre-receiving unit 258.

However, in embodiments in which the pre-receiving unit comprises more than one multiplexer, as shown by pre-receiving unit 258 in FIG. 2, the discrete frequency band outputs of pre-receiving unit 258 may correspond to the filtered signals provided by multiplexer 214 in other than a one-to-one manner. For example, as shown in FIG. 2, low satellite band signal 244, mid satellite band signal 246, and high satellite band signal 248 provided as filtered signal outputs from pre-receiving unit 258 and coupled to tuner down/converter 234 may all be seen to correspond to high-band output signal 226 from multiplexer 214.

The exemplary embodiment of front-end system 206 illustrated in FIG. 2 will be further described by reference to flowchart 300, in FIG. 3, which describes the steps, according to one embodiment of the present invention, of a method for use by a front-end system for processing a composite wideband signal. It is noted that certain details and features have been left out of flowchart 300 that are apparent to a person of ordinary skill in the art. For example, a step may comprise one or more substeps or may involve specialized equipment or materials, as known in the art. While steps 310 through 340 indicated in flowchart 300 are sufficient to describe one embodiment of the present invention, other embodiments of the invention may utilize steps different from those shown in flowchart 300.

Beginning with step 310 of flowchart 300 and referring to FIG. 2, step 310 of flowchart 300 comprises receiving composite wideband signal 202. As shown in FIG. 2, composite wideband signal 202 may be received by front-end system 206 through a connector, such as F connector 204, for example. As previously explained by reference to FIG. 1, composite wideband signal 202 may include signal content from a variety of possible sources, such as a satellite dish and/or one or more signals provided over a cable and/or telecommunications network.

Figure 3:
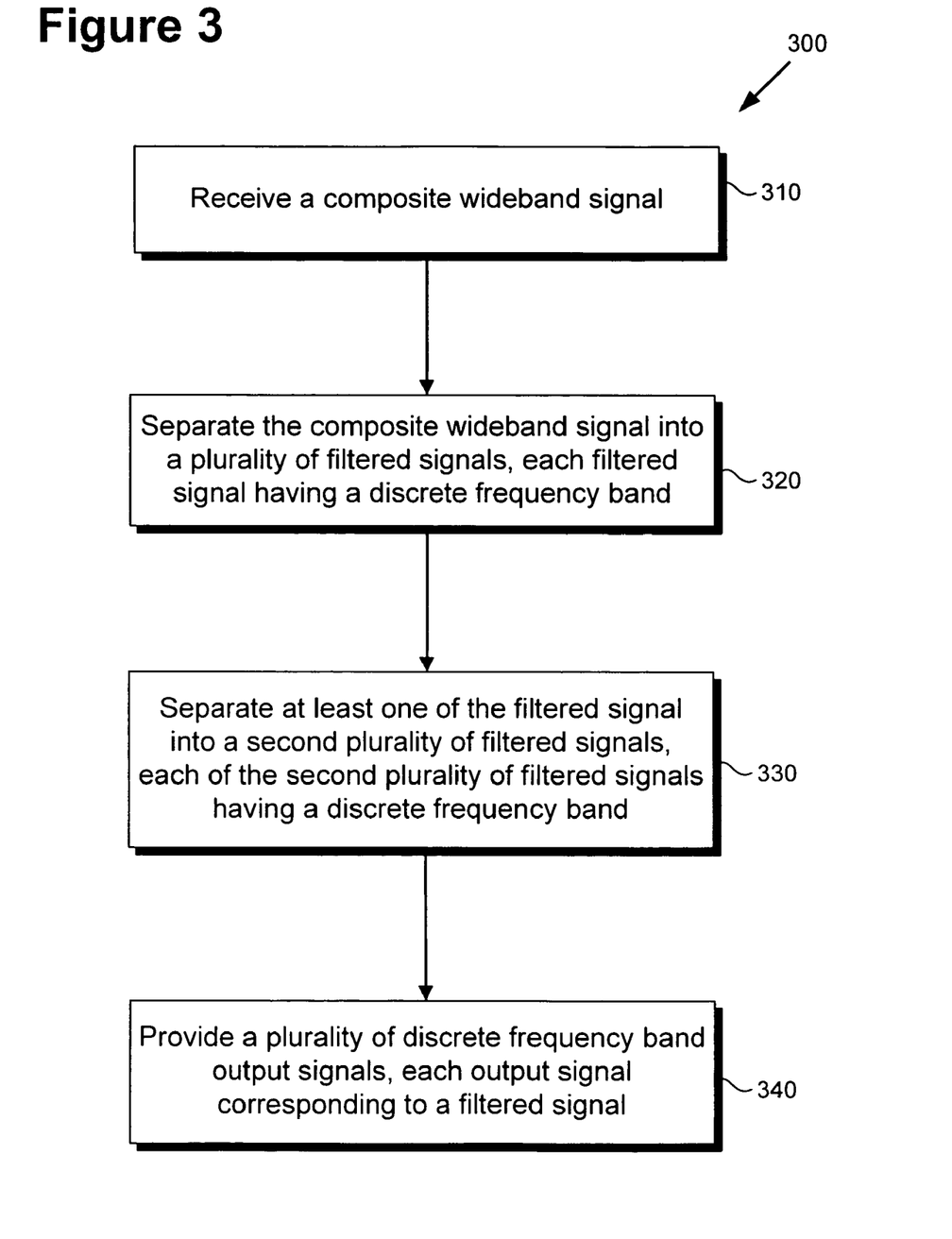
FIG. 3 is a flowchart of a method for use by a front-end system to process a composite wideband signal, according to one embodiment of the present invention.

Continuing with step 320 of FIG. 3, and continuing also to refer to FIG. 2, step 320 of flowchart 300 comprises separating composite wideband signal 202 into a plurality of filtered signals, each characterized by a discrete frequency band, prior to passing any of the signals comprised by composite wideband signal 202 to receiver/down-converter 234. Step 320 may be performed by pre-receiving unit 258, using multiplexer 214, for example, which may be configured to separate composite wideband signal 202 into filtered signals including high-band output signal 226, mid-band output signal 242, and low-band cable television output 212.

As shown by step 330 of flowchart 300, in some embodiments, a method for use by a front-end system for processing a composite wideband signal may include separating one or more of the filtered signals provided by multiplexer 214 into a second plurality of filtered signals. Each of the second plurality of filtered signals may also be characterized by a discrete frequency band. As shown in FIG. 2, step 330 may be performed by second multiplexer 224 of pre-receiving unit 258. For example, second multiplexer 224 may be configured to separate high-band output signal 226 into discrete satellite frequencies. According to the embodiment of FIG. 2, for example, LNA 222 may be employed to process high-band output signal 226 into linearized high-band signal 228 before linearized high-band signal 228 is input into second multiplexer 224. The filtered signals provided as discrete frequency band outputs from second multiplexer 224 may include, for example, low-band satellite signal 244, mid-band satellite signal 246, and high-band satellite signal 248.

Continuing with step 340 of flowchart 300, step 340 comprises providing a plurality of discrete frequency band output signals, each output signal corresponding to a filtered signal. As illustrated in FIG. 2, output signals may be taken from multiplexer 214, second multiplexer 224, or a combination of multiplexer 214 and second multiplexer 224. Examples of output signals include signals corresponding to the bandwidths of different types of media. For instance, output signals could include a combination of cable television signals taken from low-band cable television signal 212, a MoCA signal taken from mid-band output signal 242, and one or more satellite signals taken from high-band output signal 226. Exemplary output signals could also include any or all of low-band satellite signal 244, mid-band satellite signal 246, and high-band satellite signal 248.

Figure 4A:
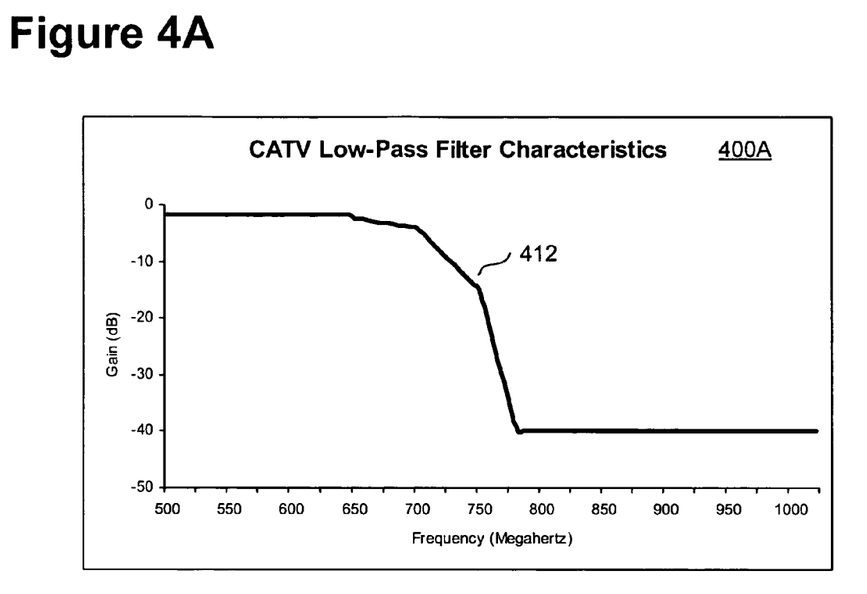
FIG. 4A is a graph showing lowpass filter characteristics of a pre-receiving unit of the exemplary front-end system of FIG. 2 across an exemplary range of frequencies, according to one embodiment of the present invention.

FIGS. 4A, 4B, and 4C, and FIGS. 5A, 5B, and 5C illustrate how embodiments of the present invention can perform in the separation of a composite wideband signal. FIG. 4A, for instance, details one potential output of multiplexer 214. More specifically, FIG. 4A shows CATV Low-Pass Filter Characteristics 400A consistent with transmission of a cable television signal. CATV Low-Pass Filter Characteristics 400A is consistent with a configuration of multiplexer 214 wherein CATV low-pass frequency response function 412 details low-band cable television output signal 212. As CATV low-pass frequency response function 412 shows, embodiments of the invention may be designed to pass frequencies below approximately 700 Megahertz (MHz), for example. Passed frequencies may correspond to cable television broadcasts.

Figure 4B:
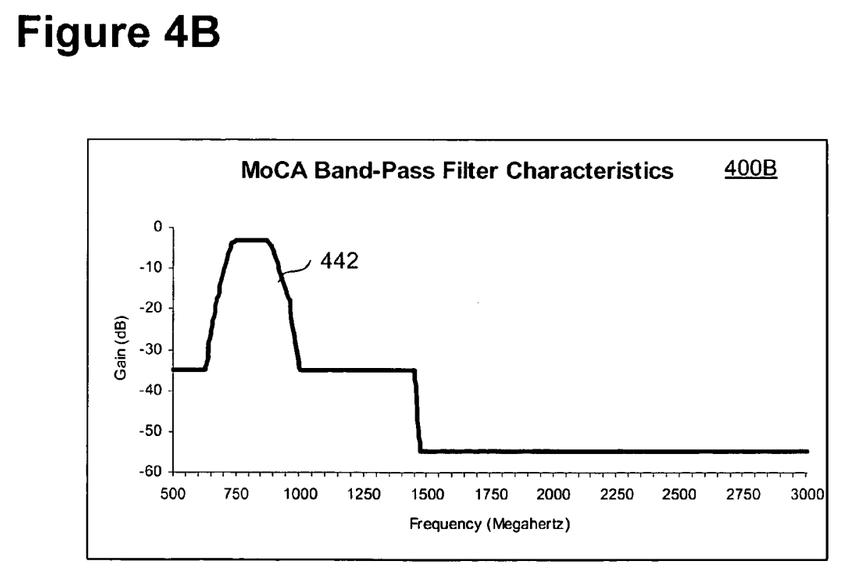
FIG. 4B is a graph showing bandpass filter characteristics of a pre-receiving unit of the exemplary front-end system of FIG. 2 across an exemplary range of frequencies, according to one embodiment of the present invention.

FIG. 4B shows how embodiments of the present invention can be designed to pass MoCA signals. MoCA Band-Pass Filter Characteristics 400B details mid-band output signal 242 when configured to pass frequencies governing MoCA transmissions. MoCA band-pass frequency response function 442 shows that multiplexer 214 can be designed to pass frequencies between approximately 750 MHz and approximately 900 MHz. MoCA signals with frequencies between approximately 750 MHz and approximately 900 MHz can therefore pass through multiplexer 214 for further processing or end use.

Figure 4C:
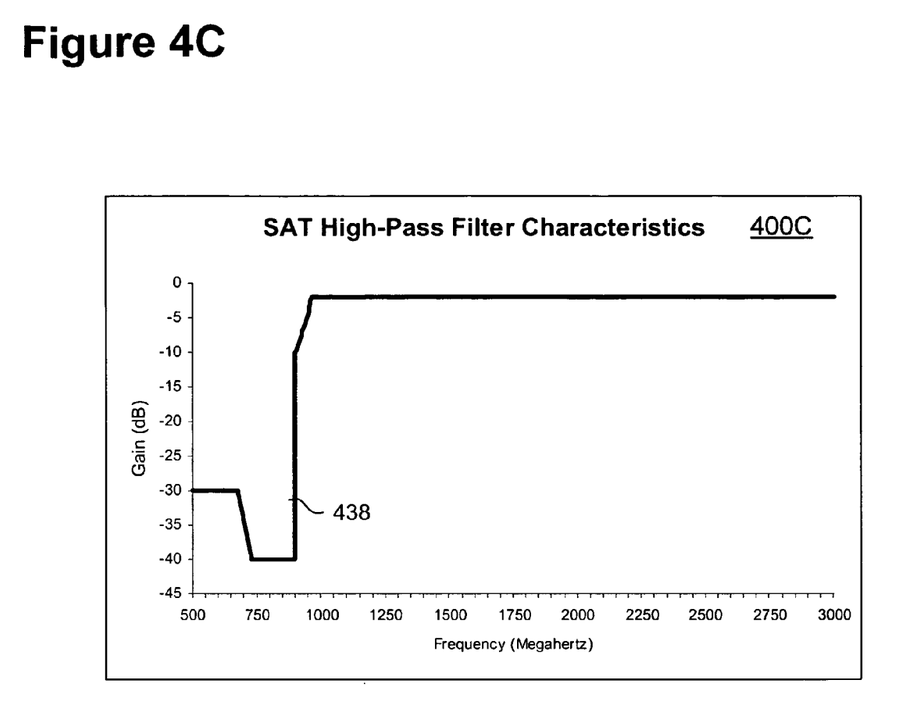
FIG. 4C is a graph showing highpass filter characteristics of a pre-receiving unit of the exemplary front-end system of FIG. 2 across an exemplary range of frequencies, according to one embodiment of the present invention.

FIG. 4C illustrates how sample satellite frequency bands can be filtered using embodiments of the present invention. SAT High-Pass Filter Characteristics 400C shows high-band frequency response function 426, a function corresponding to high-band output signal 226 as the signal is emitted from multiplexer 214. High-band frequency response function 426 illustrates that embodiments of the invention can be used to effectively pass frequencies above approximately 950 MHz. Frequencies higher than approximately 950 MHz can either be output to an end user or to a second processing stage for further filtering.

Figure 5A:
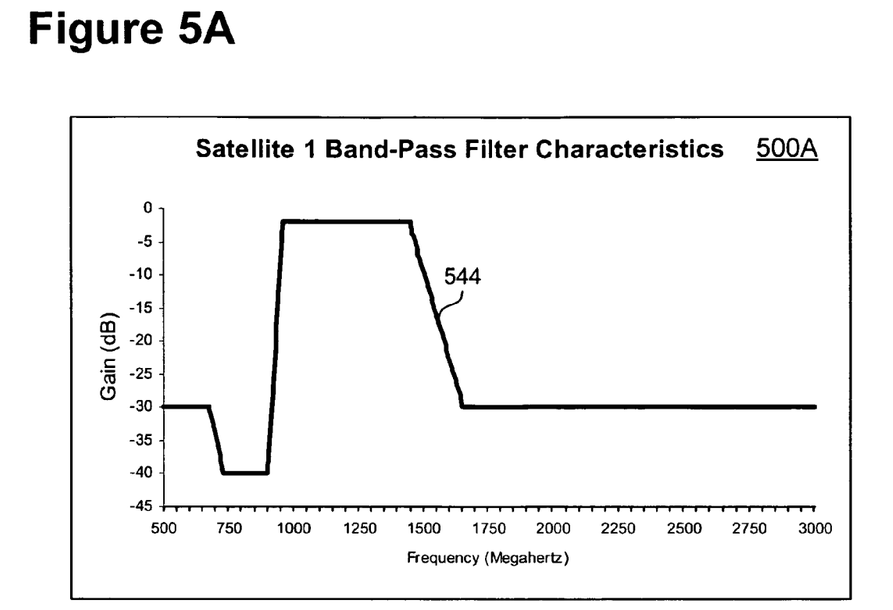
FIG. 5A is a graph showing low satellite band filter characteristics of a pre-receiving unit of the exemplary front-end system of FIG. 2 across an exemplary range of frequencies, according to one embodiment of the present invention.
Figure 5B:
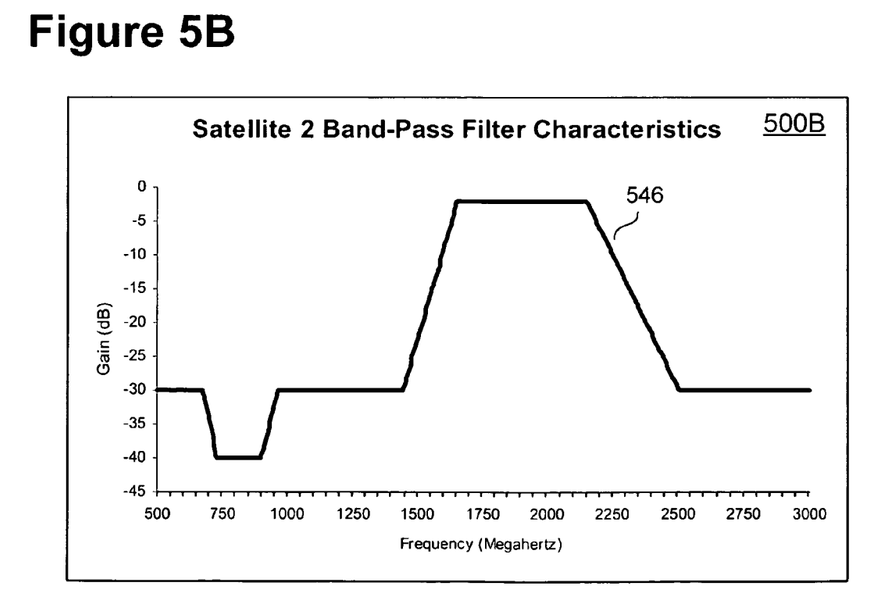
FIG. 5B is a graph showing mid satellite band filter characteristics of a pre-receiving unit of the exemplary front-end system of FIG. 2 across an exemplary range of frequencies, according to one embodiment of the present invention.
Figure 5C:
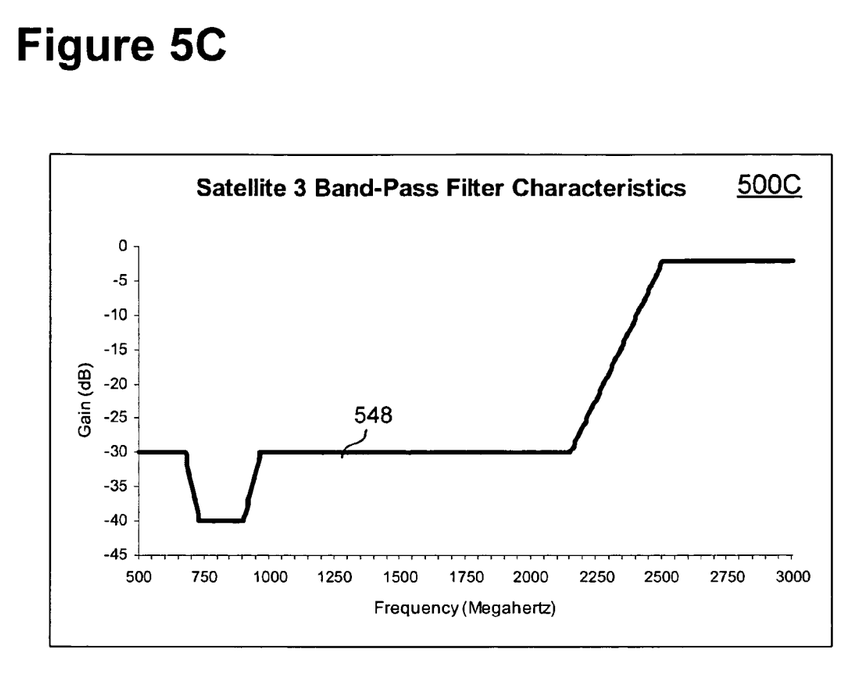
FIG. 5C is a graph showing high satellite band filter characteristics of a pre-receiving unit of the exemplary front-end system of FIG. 2 across an exemplary range of frequencies, according to one embodiment of the present invention.

FIGS. 5A, 5B, and 5C illustrate possible frequency responses of an exemplary second processing stage of some embodiments of the present invention that can be used to process satellite signals. FIG. 5A shows Satellite 1 Band-Pass Filter Characteristics 500A, which further shows SAT 1 frequency response function 544, a function corresponding to low-band satellite signal 244. Satellite 1 Band-Pass Filter Characteristics 500A shows how embodiments of the invention can be used to effectively pass frequencies between approximately 950 MHz and approximately 1450 MHz.

Similarly, SAT 2 Band-Pass Filter Characteristics 500B in FIG. 5B shows potential SAT 2 frequency response function 546. SAT 2 frequency response function 546 corresponds to mid-band satellite signal 246 and can be used to pass frequencies between approximately 1650 MHz and approximately 2150 MHz, for example.

FIG. 5C illustrates SAT 3 Band-Pass Filter Characteristics 500C. In FIG. 5C, SAT 3 frequency response function 548 corresponds to high-band satellite signal 248. SAT 3 frequency response function shows how embodiments of the invention can be designed to effectively pass frequencies between approximately 2500 MHz and approximately 3000 MHz.

Embodiments of the front-end system disclosed herein demonstrate several advantages over the conventional art. Separation of a composite wideband signal prior to down-conversion reduces the aggregate energy input into a tuner/down-converter. Use of the front-end system and method therefore reduces the probability of saturation of a tuner/down-converter and ensures users reliable access to multimedia content from various sources, including satellite signals, MoCA signals and cable television signals.

Additionally, the assembly of embodiments of the disclosed front-end system including a pre-receiving unit substantially implemented using integrated passive devices allows for the creation of satellite signal separation devices that can fit within users' homes and offices. The assembly of embodiments of the front-end system using substantially passive electronic components also allows satellite signal separation devices to maintain linearity and consume limited amounts of power. Accordingly, the invention overcomes the shortcomings in the conventional art, some of which were discussed above.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

The invention claimed is:
1. A front-end system for processing a composite wideband signal, said front-end system comprising:
  a pre-receiving unit including a multiplexer for separating said composite wideband signal into a plurality of filtered signals;
  a plurality of discrete frequency band outputs corresponding to said plurality of filtered signals; and
  a tuner/down-converter coupled to at least one output of said plurality of discrete frequency band outputs.

2. The front-end system of claim 1, wherein:
a first output of said plurality of discrete frequency band outputs is characterized by frequencies below approximately 700 Megahertz (MHz);
a second output of said plurality of discrete frequency band outputs is characterized by frequencies between approximately 725 MHz and approximately 900 MHz;
a third output of said plurality of discrete frequency band outputs is characterized by frequencies above approximately 900 MHz.

3. The front-end system of claim 1, wherein:
a first output of said plurality of discrete frequency band outputs corresponds to a cable television transmission signal;
a second output of said plurality of discrete frequency band outputs corresponds to a multimedia over coaxial alliance (MoCA) transmission signal; and
a third output of said plurality of discrete frequency band outputs corresponds to a satellite transmission signal.

4. The front-end system of claim 1, wherein:
a first output of said plurality of discrete frequency band outputs is produced by a low-pass filter with a cutoff frequency of approximately 700 MHz;
a second output of said plurality of discrete frequency band outputs is produced by a band-pass filter with a lower cutoff frequency of approximately 725 MHz and an upper cutoff frequency of approximately 900 MHz; and
a third output of said plurality of discrete frequency band outputs is produced by a high-pass filter with a cutoff frequency of approximately 940 MHz.

5. The front-end system of claim 1, wherein said multiplexer of said pre-receiving unit is implemented on a single semiconductor die.

6. The front-end system of claim 1, wherein said multiplexer of said pre-receiving unit is substantially implemented using integrated passive devices.

7. The front-end system of claim 1, wherein:
said pre-receiving unit further comprises a second multiplexer for separating at least one of said plurality of filtered signals into a second plurality of filtered signals; and
said tuner/down-converter is coupled to at least one of said second plurality of filtered signals.

8. The front-end system of claim 7, wherein said second plurality of filtered signals comprise satellite transmission signals.

9. The front-end system of claim 7, wherein:
a first of said second plurality of filtered signals is characterized by frequencies between approximately 950 MHz and approximately 1450 MHz;
a second of said second plurality of filtered signals is characterized by frequencies between approximately 1650 MHz and approximately 2150 MHz; and
a third of said second plurality of filtered signals is characterized by frequencies above approximately 2500 MHz.

10. The front-end system of claim 7, wherein:
a first of said second plurality of filtered signals is produced by a band-pass filter with a lower cutoff frequency of approximately 950 MHz and an upper cutoff frequency of approximately 1450 MHz;
a second of said second plurality of filtered signals is produced by a band-pass filter with a lower cutoff frequency of approximately 1650 MHz and an upper cutoff frequency of approximately 2150 MHz; and
a third of said second plurality of filtered signals is produced by a band-pass filter with a lower cutoff frequency of approximately 2500 MHz and an upper cutoff frequency of approximately 3000 MHz.

11. The front-end system of claim 7, wherein said second multiplexer of said pre-receiving unit is implemented on a single semiconductor die.

12. The front-end system of claim 7, wherein said second multiplexer of said pre-receiving unit is substantially implemented using integrated passive devices.

13. A method for use by a front-end system to process a composite wideband signal, said method comprising:
separating said composite wideband signal into a plurality of filtered signals;
providing a plurality of discrete frequency band outputs corresponding to said plurality of filtered signals; and
providing at least one output of said plurality of discrete frequency band outputs for input into a tuner/down-converter.

14. The method of claim 13, wherein:
a first output of said plurality of discrete frequency band outputs is characterized by frequencies below approximately 700 Megahertz (MHz);
a second output of said plurality of discrete frequency band outputs is characterized by frequencies between approximately 725 MHz and approximately 900 MHz; and
a third output of said plurality of discrete frequency band outputs is characterized by frequencies above approximately 900 Megahertz.

15. The method of claim 13, wherein:
a first output of said plurality of discrete frequency band outputs corresponds to a cable television transmission signal;
a second output of said plurality of discrete frequency band outputs corresponds to a multimedia over coaxial alliance (MoCA) transmission signal; and
a third output of said plurality of discrete frequency band outputs corresponds to a satellite transmission signal.

16. The method of claim 13, further comprising:
separating at least one of said plurality of filtered signals into a second plurality of filtered signals; and
providing said second plurality of filtered signals to a tuner/down-converter.

17. The method of claim 16, wherein:
a first of said second plurality of filtered signals corresponds to a frequency band of frequencies between approximately 950 MHz and approximately 1450 MHz;
a second of said second plurality of filtered signals corresponds to a frequency band of frequencies between approximately 1650 MHz and approximately 2150 MHz; and
a third of said second plurality of filtered signals corresponds to a frequency band of frequencies above approximately 2500 MHz.

18. A pre-receiving unit for filtering composite wideband signals, said pre-receiving unit comprising:
a multiplexer for separating said composite wideband signals into a plurality of filtered signals;
a plurality of discrete frequency band outputs corresponding to said plurality of filtered signals; and
wherein at least one of said plurality of discrete frequency band outputs is adapted for use by a tuner/down-converter.

19. The pre-receiving unit of claim 18, further comprising:
a second multiplexer for separating at least one of said plurality of filtered signals into a second plurality of filtered signals; and wherein at least one of said second plurality of filtered signals is adapted for use by a tuner/down-converter.

20. The pre-receiving unit of claim 18, further comprising:
a second multiplexer for separating at least one of said plurality of filtered signals into a second plurality of filtered signals; and
a low-noise amplifier for processing at least one of said plurality of filtered signals before said at least one of said plurality of filtered signals is input into said second multiplexer.

* * * * *